Sept. 15, 1931.  I. H. FRAILEY  1,823,598
WINDSHIELD WIPER
Filed Dec. 23, 1929  2 Sheets-Sheet 1
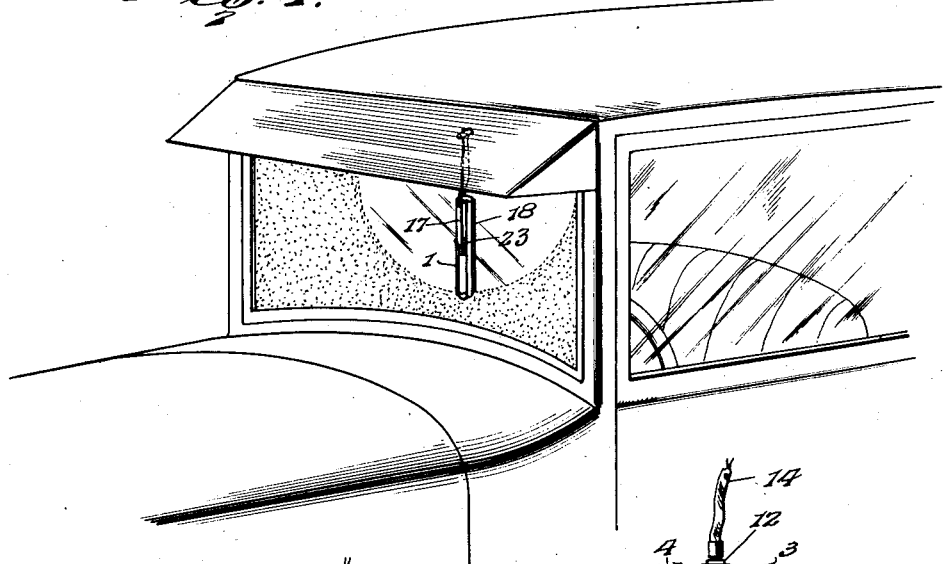
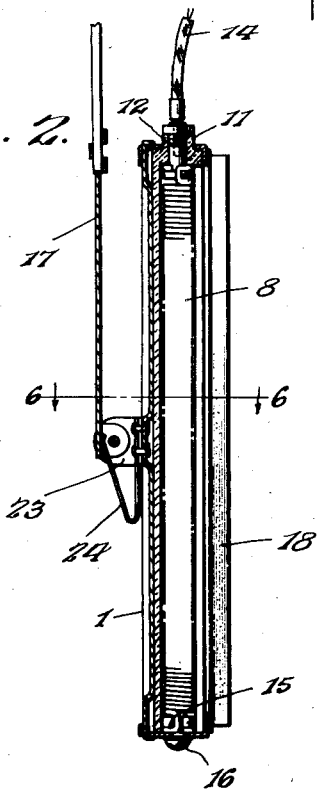
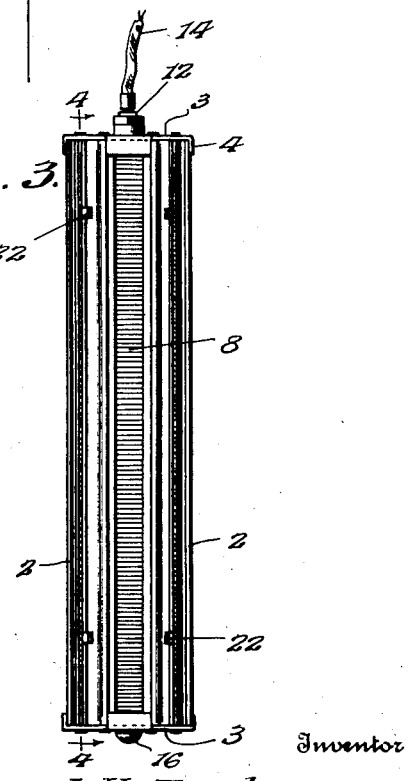
Inventor
I. H. Frailey.
By Lacey & Lacey,
Attorney Sept. 15, 1931.   I. H. FRAILEY   1,823,598
WINDSHIELD WIPER
Filed Dec. 23, 1929   2 Sheets-Sheet 2
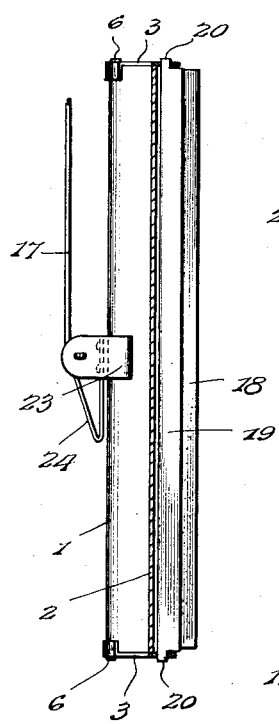
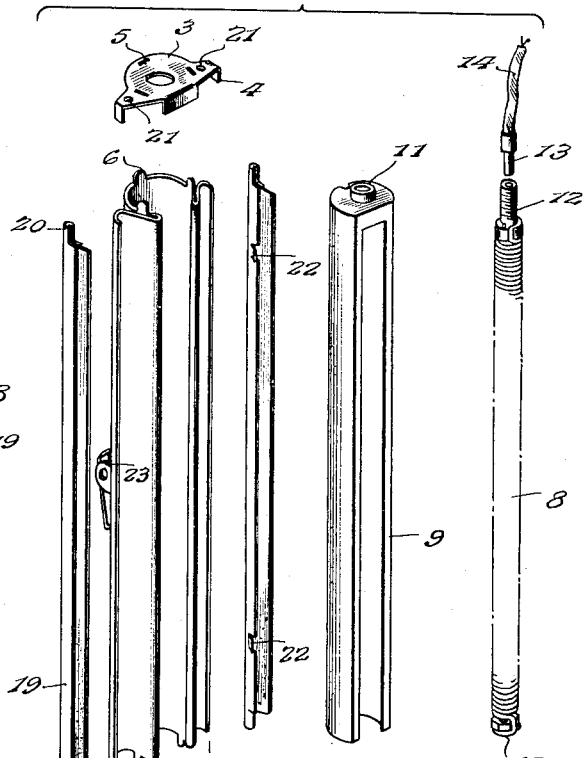
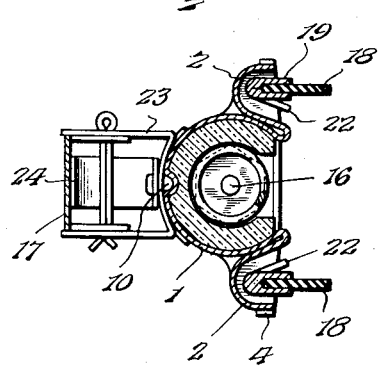
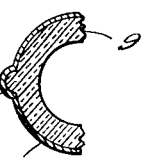
Inventor
I. H. Frailey.
By Lacey & Lacey,
Attorneys Patented Sept. 15, 1931

1,823,598

UNITED STATES PATENT OFFICE

IRVIN H. FRAILEY, OF WINDBER, PENNSYLVANIA, ASSIGNOR TO WINDBER MANUFACTURING COMPANY, OF WINDBER, PENNSYLVANIA, A CORPORATION OF DELAWARE

WINDSHIELD WIPER

Application filed December 23, 1929. Serial No. 416,119.

The invention appertains to cleaners, particularly of the type designed for removing frost and moisture from a windshield, such as generally provided on motor vehicles.

The invention contemplates a cleaner of the class indicated embodying an electric heater unit for removal of frost from the windshield in cold weather, said heater being readily removable in warm weather or when required for any purpose.

The invention provides a cleaner of the nature aforesaid having the wiper element rockably mounted to admit of its ready adaptation to a reverse movement incident to the oscillation of the cleaner when in action.

A further purpose of the invention resides in the mounting of the heater to insure protection of the parts and utilization of a maximum percentage of the heat in the removal of frost and dissipation of moisture.

The invention, furthermore, aims to provide a device of the character aforesaid which may be manufactured at a low cost, admit of ready assemblage of the parts and dismemberment thereof for any purpose, and which, in operation, is efficient to insure a clear vision windshield free from frost and moisture.

It is to be understood that the form of the invention herein disclosed is preferred. However, in adapting the same to meet different conditions, various changes in the shape, size, and arrangement of parts may be resorted to without departing from the spirit of the invention as claimed.

For a full understanding of the invention and the merits thereof, reference is to be had to the following description and the drawings hereto attached, in which corresponding parts are designated by like reference characters.

In the drawings:

Figure 1 is a perspective view illustrative of the invention applied to the windshield of a motor vehicle.

Figure 2 is a central, longitudinal, sectional view of the device.

Figure 3 is a front view.

Figure 4 is a detail sectional view on the line 4—4 of Figure 3, looking in the direction indicated by the arrows.

Figure 5 is a developed view of the device, the component parts being shown in perspective and in relative position.

Figure 6 is an enlarged transverse sectional view on the line 6—6 of Figure 2, looking in the direction indicated by the arrows.

Figure 7 is a sectional detail showing a modification.

Figure 8 is a detail view of a further modification.

The casing preferably consists of sheet metal such as aluminum and comprises an intermediate receptacle 1 and similar side receptacles 2, and is closed at its ends preferably by detachable caps 3. As indicated most clearly in Figure 6 of the drawings, the receptacles 1 and 2 are open at the side adapted to be presented to the windshield. The receptacles 1 and 2 are approximately of circular outline in cross section and are formed by crimping a sheet metal blank intermediate its longitudinal edges. As a result of this formation, the receptacles are uniform throughout and are open at their ends, thereby necessitating the provision of end closures which are likewise formed of sheet metal pressed into proper shape. Flanges 4 formed as a part of the closures 3, assist materially in retaining the closures in place. The closures or caps 3 may be secured to the casing in any determinate way. As shown, openings 5 are formed in the closures to receive ears 6 provided at opposite ends of the casing, the projecting ends of the ears being bent against the outer sides of the closures to retain them in position.

In the modification shown in Figure 8, the flange 4 is continuous to encircle the casing and interengaging elements secure the caps when pressed upon the ends of the casing. The fastening means 7 consist of a portion pressed outwardly from the casing and a depression similarly formed in the flange 4 of the closure, said elements engaging by a snap action when the cap is pressed home when applying it to the casing.

The heater consists of a resistance coil 8 and is disposed within a core or liner 9 of porcelain or other suitable insulating material. The core or liner 9 has a snug fit within the part 1 of the casing and is insertable and removable by means of an endwise sliding movement and is retained in place by means of the end caps 3. One side of the core or liner is open and registers with the open side of the casing to expose a portion of the heating coil 8. The side walls of the casing are contracted to embrace opposite side portions of the core or liner and prevent outward displacement thereof. This is indicated most clearly in Figure 6 of the drawings. As the outline of the core is circular to conform to the receptacle 1, there is a tendency of the core to turn and this is offset by providing a tongue and groove joint between the casing and core. This tongue and groove joint is indicated at 10, and, as shown in Figure 6, the groove is formed along the outer side of the core 9, whereas, Figure 7 shows the reverse of this arrangement, the groove being formed in the casing and the tongue projecting outwardly from the core and serving as a reinforcement therefor, which is of advantage when the core or liner consists of porcelain or other easily broken refractory material. A boss 11 is formed at one end of the core or liner 9 and extends through an opening formed in the end closure or cap 3 of the casing. A metal socket 12 is fitted to one end of the heating coil and extends through the boss 11. The socket 12 is adapted to receive the tip 13 of an electric cord 14, by means of which current is supplied to the heater. A socket 15 is fitted to the opposite end of the heating coil and receives a screw 16 which engages the adjacent closed end of the casing whereby to ground the coil through the casing and the supporting arm 17 to which the cleaner is attached.

A wiper or cleaner element is mounted in each of the receptacles 2 and consists of a flexible lip 18 of rubber or other suitable material and a back 19 of rigid material such as metal which is folded to clamp an edge portion of the part 18 therebetween. The cleaner or wiper is rockably mounted and, for convenience, is provided at opposite ends with journals 20 which are mounted in openings 21 formed in the caps or closures 3. The journals 20 preferably consist of extensions of the back 19. The wipers or cleaners have a limited rocking movement which is determined in one direction by stops 22 projecting laterally from the rigid back 19 and forming a part thereof. The stops 22 are disposed upon the inner sides of the wipers or cleaners to limit their movement toward the heater, thereby preventing injury to the flexible lip 18.

When one of the end caps or closures 3 is removed the heater and wipers may be readily placed in position or removed from the casing. When the parts are assembled, they are retained in proper position by means of the end closures 3 which are secured to the casing either by means of the ears 6 or the fastening means 7 herein indicated, or in any preferred manner. This arrangement admits of the heater being readily removed in warm weather or for other purposes.

A bracket 23 is provided upon the rear side of the casing intermediate the ends thereof and receives the arm 17 which is pivoted thereto. A contact spring 24 is attached at one end to the bracket 23 and its opposite end engages the arm 17 and maintains engagement therewith to prevent any variation or interruption in the outflow of the current from the heating coil 8 when the same is in action. The bracket 23 and spring 24 may be riveted to the casing or secured thereto in any determinate way.

The operation of the device may be readily comprehended from the foregoing description, reference being had to the drawings hereto attached. The cleaner or wiper is of the squeegee type and the flexible lip 18 flexes in opposite directions as the movement of the device is reversed, hence the advantage of mounting the cleaner to admit of its rocking so that the lip will readily adapt itself to the change of direction as the wiper operates in its travel across the windshield.

What is claimed is:

1. A windshield wiper comprising a casing closed at its ends and open at one side, a wiper element rockably mounted in the casing and having terminal journals engaging openings formed in the closed ends of the casing.

2. A windshield wiper comprising a casing having a middle and side receptacles, caps closing the ends of the casing and side receptacles and detachably fitted thereto, a heater removably fitted within the intermediate receptacle and displaceable therefrom by an endwise sliding movement, and cleaner elements rockably mounted in the side receptacles and having terminal journals engaging openings in the end closures of the casing.

3. A windshield wiper comprising a sheet metal casing including middle and side receptacles of approximately circular outline in cross section, detachable caps closing the ends of the casing, a core of insulating material lining the middle receptacle and readily removable therefrom by an endwise sliding movement, said core having a boss at one end extending through an end closure of the casing, a resistance coil within the core and having metal sockets at its ends, one of the sockets passing through the boss at one end of the core, a fastening engaging the other socket and connecting it to the opposite end closure of the casing, and wipers rockably mounted in the side receptacles and having terminal journals engaging openings formed in the detachable caps, the parts being retained within the casing by means of the said detachable caps.

In testimony whereof I affix my signature.

IRVIN H. FRAILEY. [L. S.]